United States Patent [19]

Reid

[11] Patent Number: 5,674,744
[45] Date of Patent: Oct. 7, 1997

[54] HUMUS MAKER

[76] Inventor: John Philipp Milford Reid, 11 Church Street, Market Lavington, Wiltshire SN10 4DT, United Kingdom

[21] Appl. No.: 335,812

[22] PCT Filed: Mar. 15, 1994

[86] PCT No.: PCT/GB94/00514

§ 371 Date: May 3, 1995

§ 102(e) Date: May 3, 1995

[87] PCT Pub. No.: WO94/21578

PCT Pub. Date: Sep. 29, 1994

[30] Foreign Application Priority Data

Mar. 15, 1993 [GB] United Kingdom ............ 9305257
Sep. 30, 1993 [GB] United Kingdom ............ 9320147

[51] Int. Cl.⁶ .................... C05F 9/02; C05F 17/02
[52] U.S. Cl. ................ 435/290.1; 435/290.2; 435/818
[58] Field of Search ............ 435/290.1, 290.2, 435/290.4, 878; 71/9; 220/484, 908

[56] References Cited

U.S. PATENT DOCUMENTS

| | | | |
|---|---|---|---|
| 5,036,999 | 8/1991 | Bitsch | 220/627 |
| 5,096,080 | 3/1992 | Penny | 220/4.09 |
| 5,185,261 | 2/1993 | Warrington | 435/313 |
| 5,429,945 | 7/1995 | Shain | 435/313 |
| 5,433,524 | 7/1995 | Wuster | 366/244 |

FOREIGN PATENT DOCUMENTS

| | | |
|---|---|---|
| 3743651 | 7/1989 | Germany. |
| 9112088 | 1/1992 | Germany. |
| 9115182 | 4/1992 | Germany. |
| 9303691 | 10/1993 | Germany. |
| 61-141690 | 6/1989 | Japan. |
| 2138795 | 10/1984 | United Kingdom. |

*Primary Examiner*—William H. Beisner
*Attorney, Agent, or Firm*—Larson & Taylor

[57] ABSTRACT

The invention relates to a humus maker, particularly to an apparatus which turns household waste such as kitchen waste into mature humus, the apparatus having a lid and base with an internal windrow device which is operative to be turned manually to keep air holes in the base free for entry of air to promote aerobic decomposition, the air holes being in communication with channels through which water produced by the decomposition process escapes from the apparatus. The lid has hinged parts which are raisable for access to the interior, being held down by a handle of the windrow device in one operative position and freed for raising in a second operative position of the handle.

14 Claims, 16 Drawing Sheets

HUMUS MAKER

BACKGROUND OF THE INVENTION

The invention relates to apparatus for making humus.

Humus is generally formed by the aerobic degradation of vegetable matter which is suitably moist, e.g. up to 40% water. To produce a suitable, fully matured, sweet smelling humus, degradation under strictly controlled conditions is preferred, whereby oxygen generates heat during the degradation and above a certain temperature no methane or other noxious effluvia are produced. This produces biologically degraded humus of the desired quality and which has a desired moisture content. Such a fully matured humus is nutrient rich, and free from pathogens and toxic elements. It is also a fact that kitchen household refuse is often left to local Authorities to take away and dispose of, usually as landfill. In the United Kingdom for example, humus is produced only on a small scale, most of the U.K.'s domestic waste going to landfill. This refuse amounts to about 90% of the total volume of refuse handled by local Authorities and is moreover environmentally unfriendly as it encourages vermin, can spontaneously combust, is unsightly, and gives off noxious effluvia. There is a need therefore for inexpensive apparatus in which a householder can produce humus, thereby taking compostable refuse out of the waste stream to landfill.

Composting may generally be defined as the aerobic production of humus from the aerobic decomposition of organic wastes by microorganisms in a warm, moist atmosphere. Interaction between the organic wastes, microorganisms and aeration produces temperature, carbon dioxide gas, water, and humus. In order to provide suitable conditions particularly for household waste such as kitchen waste, a suitable apparatus is required. Prior apparatus has not been able to produce a suitable product.

It is accordingly an object of the invention therefore to seek to provide a suitable apparatus.

SUMMARY OF THE INVENTION

According to the invention there is provided apparatus for making humus, comprising a body for containing material to be composted to humus, characterised by the body having a base, by the base having means for promoting air flow therethrough and through the body, and by a lid, whereby the base and lid promote aerobic decomposition of material to be composted.

Using the invention, it is possible to provide a readily erectable apparatus which can be distributed by local Authorities to householders.

There may be a plurality of holes through the base. This provides for efficient composting.

The base may comprise a plurality of superposed parts. This provides for a relatively simple construction and installation.

The base may comprise perforated planar members on which the material to be composted is received, a support means for receiving the perforated planar member, and support means which may have fluid passage means for fluid communication with the perforations in the planar member. This provides for passage of air into the apparatus, and water as a product of composting, from the apparatus.

The support means may comprise two parts which together may have a configuration substantially complementary to the planar member, and a surface of the parts may have radially arranged grooves alignable with radially arranged rows of perforations through the planar member. This provides for ease of assembly when the apparatus is delivered "knock-down".

A windrow device for windrowing material to be composted may be incorporated in the apparatus. This provides for keeping the perforations clear for fluid flow.

The windrow device may comprise a blade mounted on a rotatable shaft and a handle of the rotatable shaft mounted exteriorly of the apparatus. This provides for ease of operation.

The handle may be mounted exteriorly of the lid and adapted to be turned in a plane substantially parallel to the plane of the lid. Again, this provides for ease of operation.

The lid may have at least one flap part which is raisable whereby to provide access to the interior of the body. This provides for ease of access.

The lid may have two raisable flap parts and the handle may be adapted in one operative position to maintain the or each flap pan closed and in another operative position permitting the or each flap part to be raised. This construction enables the lid to be kept closed in for example windy conditions, so maintaining heat generated in the apparatus internally thereof. Also, the lid in the closed condition keeps out intruders such as cats, squirrels and foxes.

There may be a door to permit removal of humus material. This again provides for ease of access, particularly as there may be two doors mounted adjacent the base. Access can be from opposite sides of the apparatus.

The blade may have sharpened edges. This provides for efficient cleaning of the perforation and "turning" of the material.

The blade may be substantially centrally mounted on the shaft and the ends of the blade may be profiled to provide a surface adapted for turning the material to be composted. This is a particularly advantageous construction.

There may be strut means of the lid adapted to maintain a flap in the open position. This assists during charging of the apparatus with material to be composted.

The lid and base may be reversible. This provides for a simple moulding being able to act as both a lid and a base.

The lid and base may each comprise a member of identical configuration and the members may be reversible.

The apparatus may be erected from a set of parts which may comprise a collapsible tube for forming the body and a base insertable in the tube for maintaining same in the erected condition.

The collapsible tube may comprise a plurality of blanks secured edge-to-edge, particularly there may be two blanks. This provides for relative ease of construction and optimum use of material of the apparatus.

The body may comprise a double walled sheet material and the holes at the upper end (in use) may be through an external wall of the sheet and the holes at the lower end (in use) may be through the inner wall of the sheet.

The apparatus may be erected from a set of parts which may comprise a collapsible tube for forming the body and a base insertable in the tube for maintaining same in the erected condition. This provides for ease of storage, transport and erection.

The base may have foldable feet and a grid for supporting material to be composted, and the feet may have through holes alignable with the holes at the lower (in use) end of the body. This latter feature allows any liquids to drain away.

BRIEF DESCRIPTION OF THE DRAWINGS

Apparatus embodying the invention is hereinafter described, by way of example, with reference to the accompanying drawings.

DESCRIPTION OF THE PREFERRED EMBODIMENTS

Figure 1:
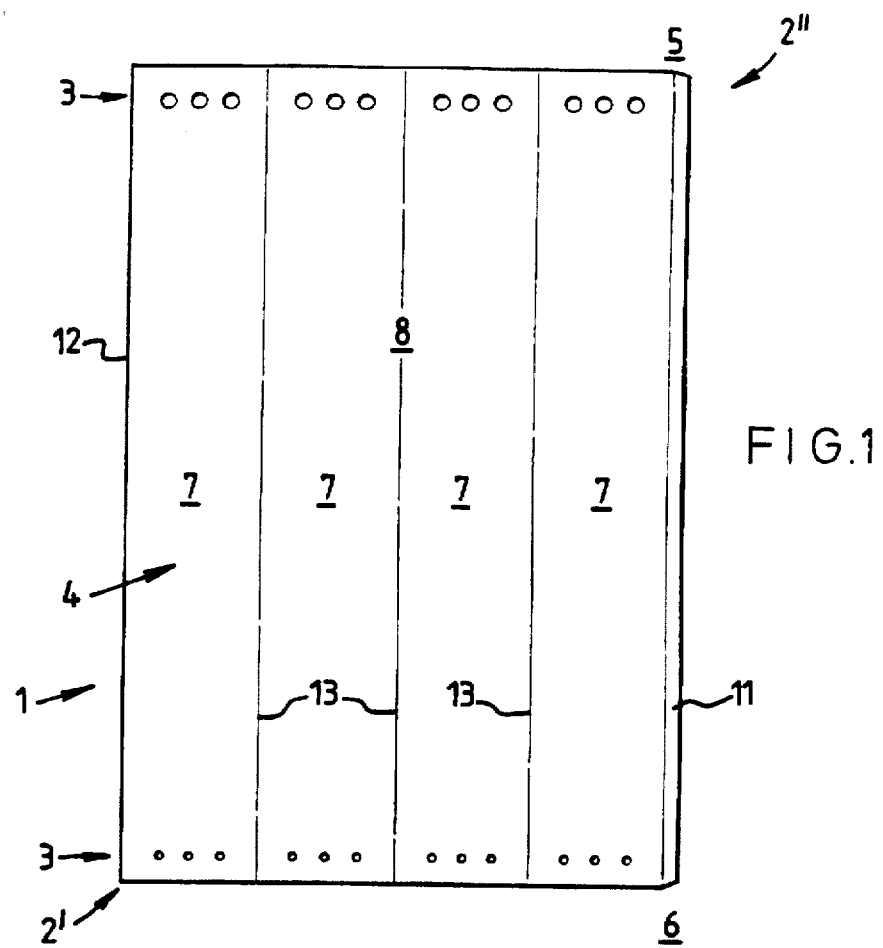
FIG. 1 is an elevational view of a blank used in the construction of a first embodiment of apparatus according to the invention for making humus.
Figure 2:
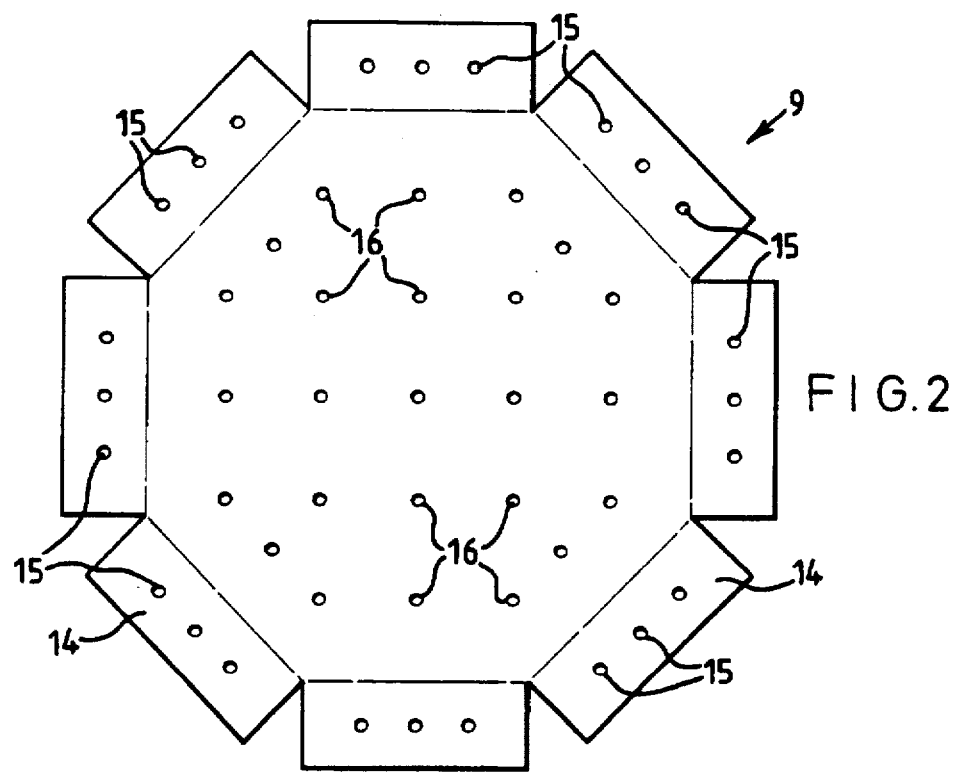
FIG. 2 is a plan view of a blank for making a base of the apparatus of FIG. 1.
Figure 3:
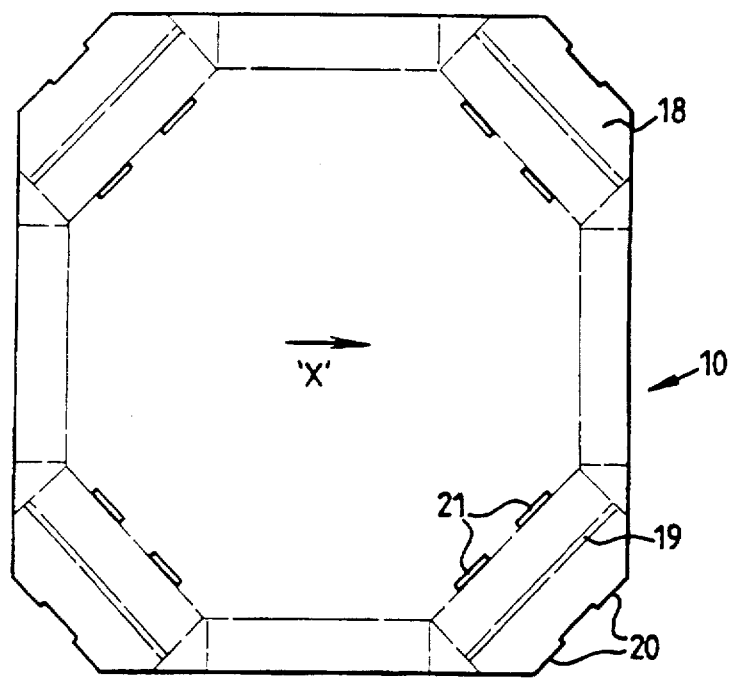
FIG. 3 is a plan view of a blank for a lid for apparatus according to FIG. 1.

Referring to the drawings, there is shown in FIGS. 1–8 apparatus 1 for making humus, comprising a hollow body 2 for containing material to be composted having a base 2' having means 3 for promoting air flow through the interior of the body 2 and a lid 2".

The means 3 for promoting air flow comprise a plurality of holes through a wall 4 of the body 2 at or adjacent opposite sides thereof. Each hole 3 is circular and in the embodiment (FIGS. 1–3) there are three equally spaced holes 3 through each of four panels 7 of a blank 8, two of which with respective blanks 9, 10 for the base 2' and lid 2" (FIGS. 2 and 3 respectively) form a set or kit of parts from which the apparatus 1 is erected, to form a bin for making humus by composting.

The blank 8 has four panels 7 and an edge flap 11 and when joined as by welding or with adhesive or other suitable means with an identical blank 8 in opposite edge-to-edge relation so that the flap 11 is secured to an opposite edge 12 of the other blank, a blank is formed which is erectable to form an octagonal (in plan) apparatus or bin 1.

The blanks 8 and the blanks 9 and 10 to form the base 2' and lid 2" are suitably formed from a sheet of extruded, fluted plastic material, such as polypropylene, marketed under for example the Registered Trade Mark "CORREX". The direction of the flutes is shown by the arrows 'X' in FIG. 3.

The panels 7 of the blank 8 are integrally formed in the sheet material as by fusion along lines substantially parallel to the flute length to form hinge or fold lines 13.

The base blank 9 has an octagonal shape in plan, and an edge flap 14 on each side each of which has through holes 15 alignable with the holes 3 at the lower end 6 of the bin.

The base 9 forms a grid by having an array 16 of through holes formed therein.

Figure 5:
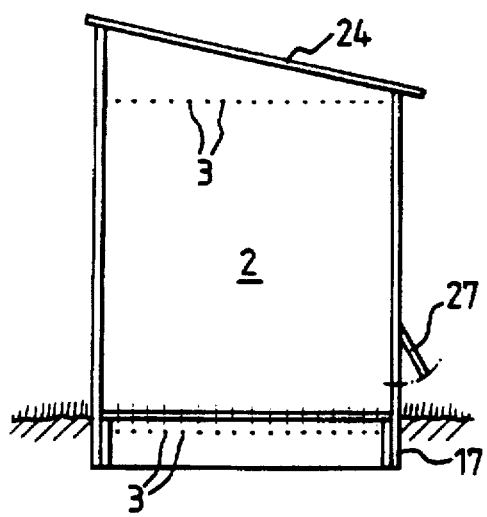
FIG. 5 shows a side elevational view of apparatus made from the blank of FIG. 4.
Figure 6:
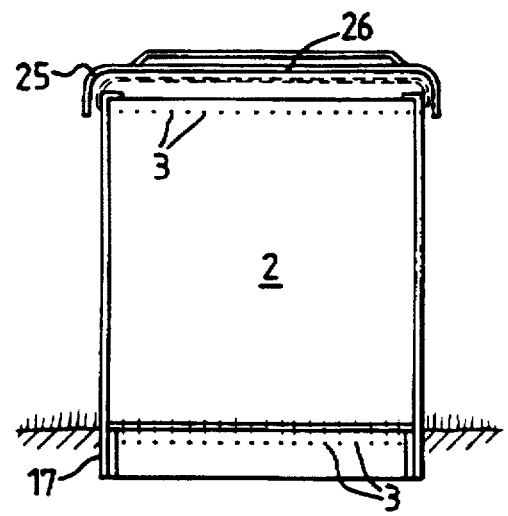
FIG. 6 shows a side elevational view of apparatus similar to apparatus made from a blank of FIG. 1.
Figure 7:
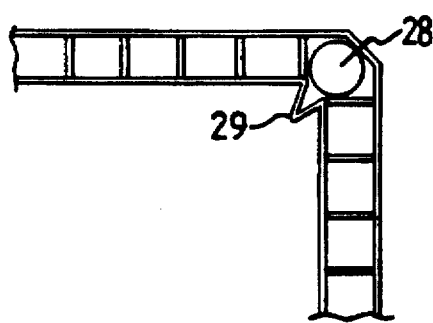
FIG. 7 shows a plan view of part of a corner of apparatus according to the invention.
Figure 8:
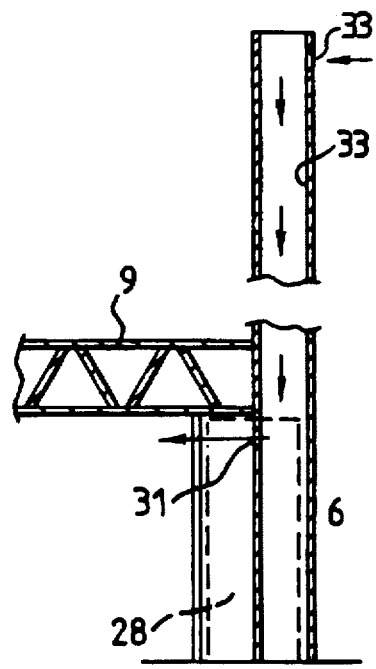
FIG. 8 shows a cross-sectional view through pan of a bottom of apparatus formed from the blank of FIG. 4.
Figure 9:
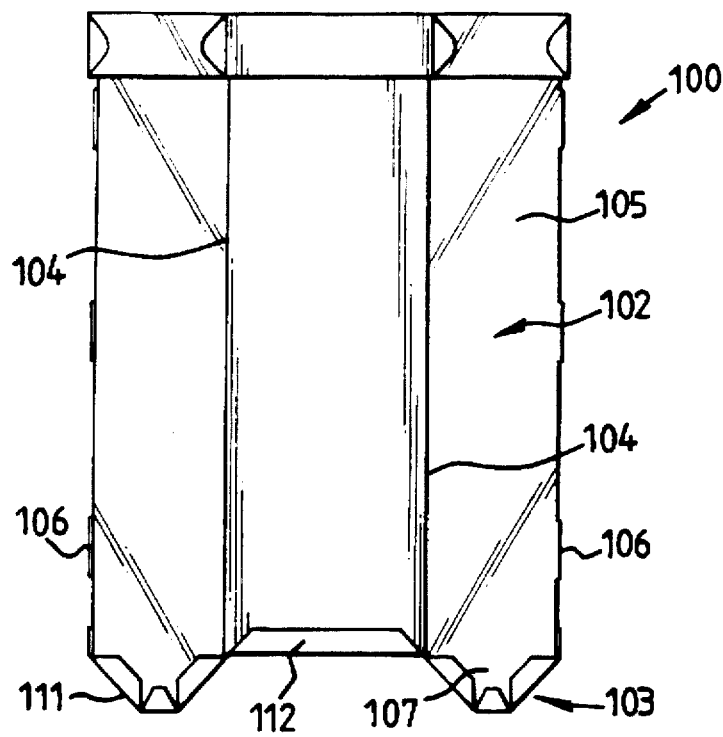
FIG. 9 is an elevational view of a further embodiment of apparatus according to the invention for making humus.
Figure 10:
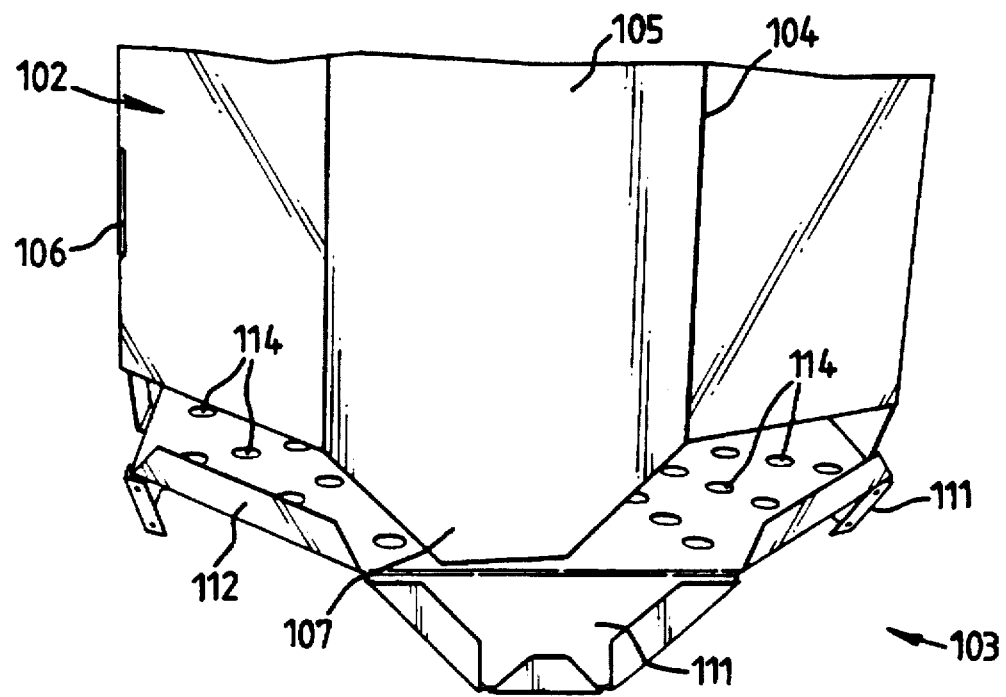
FIGS. 10–13 show stages in an erection procedure.
Figure 11:
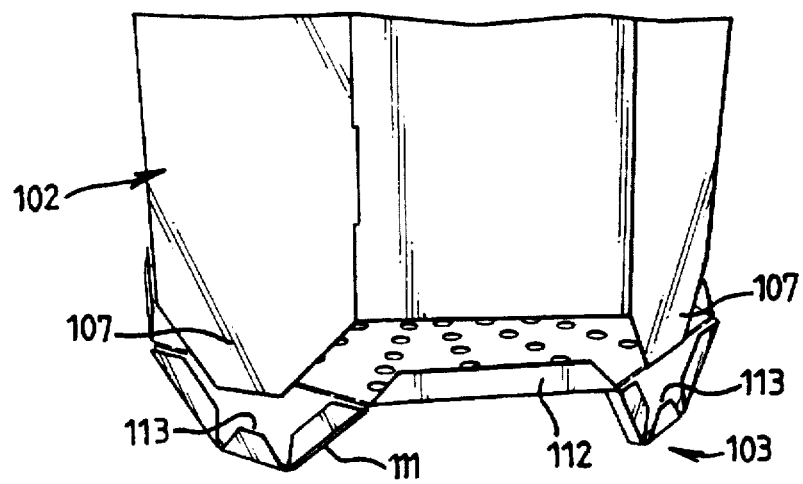
Figure 12:
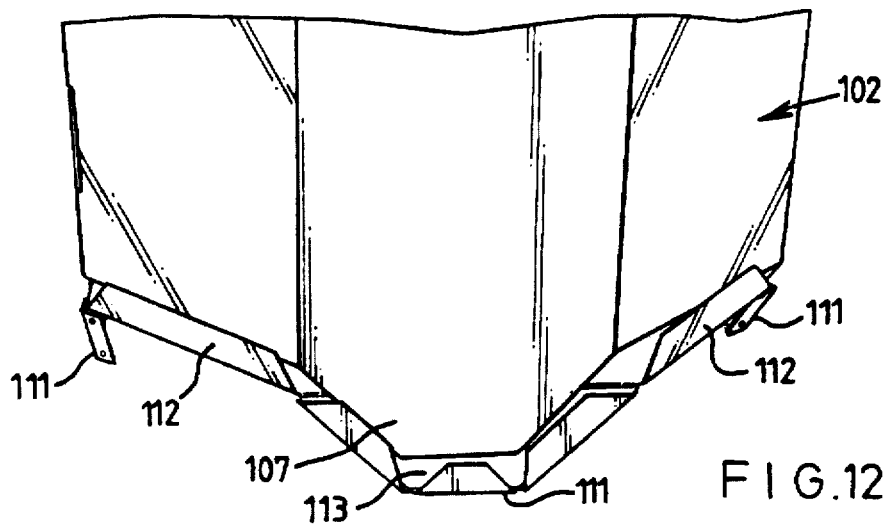
Figure 13:
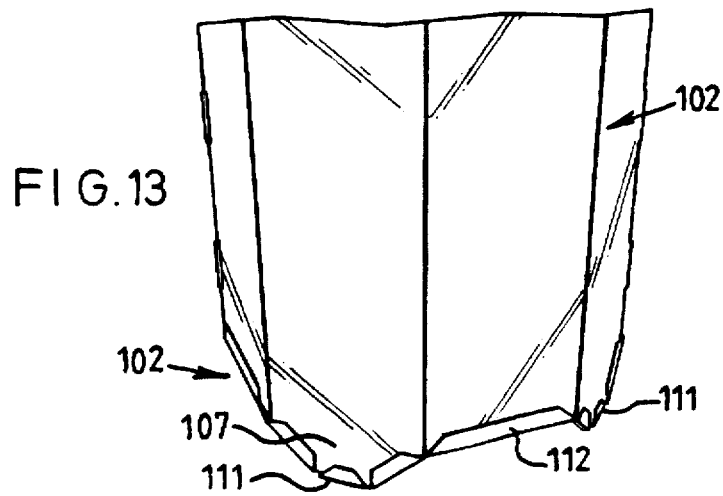
Figure 14:
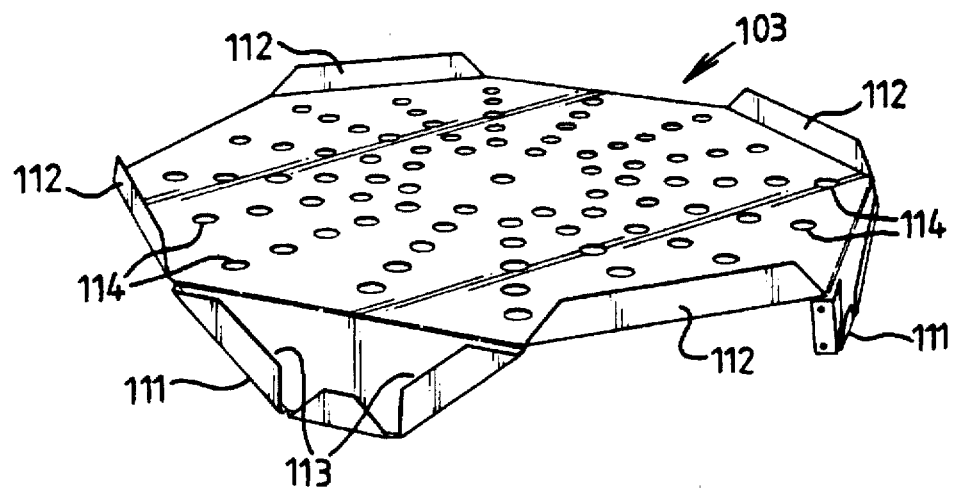
FIG. 14 shows a perspective view of a base of the bin of FIGS. 9–13.
Figure 15:
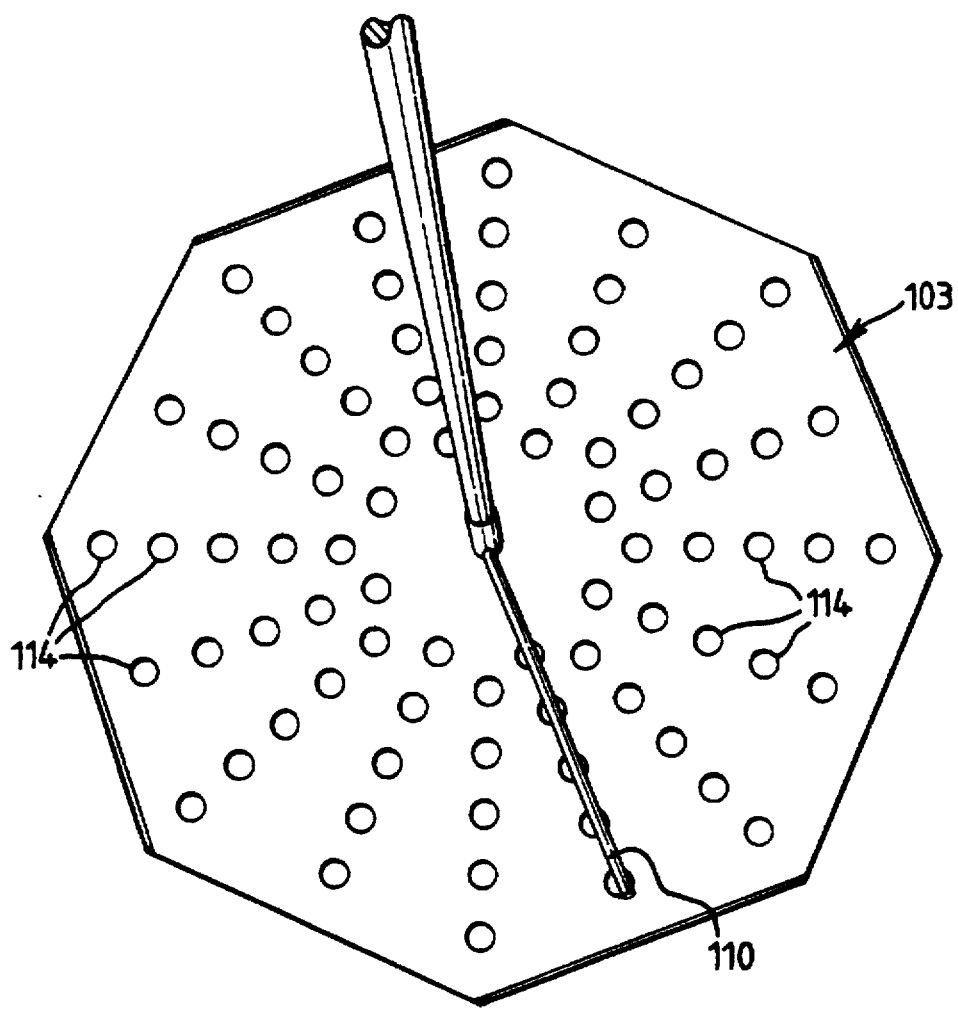
FIG. 15 is a schematic view of the interior of the bin of FIG. 9.
Figure 16:
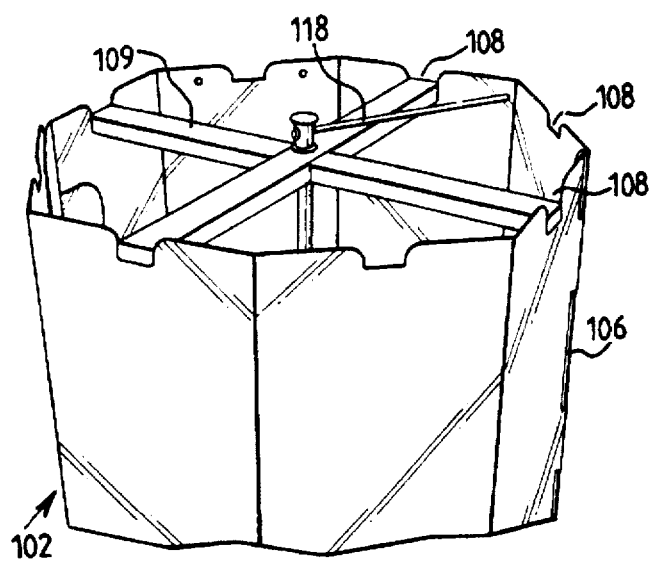
FIG. 16 shows a perspective view of the top of the bin of FIG. 9, with no lid.
Figure 17:
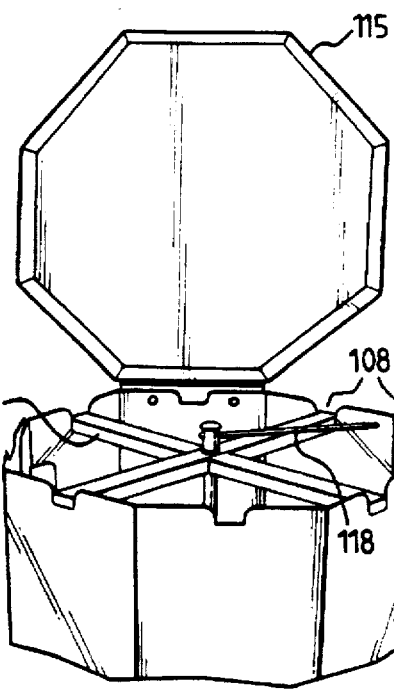
FIG. 17 shows a view similar to FIG. 16 with a lid in place, and raised.
Figure 19:
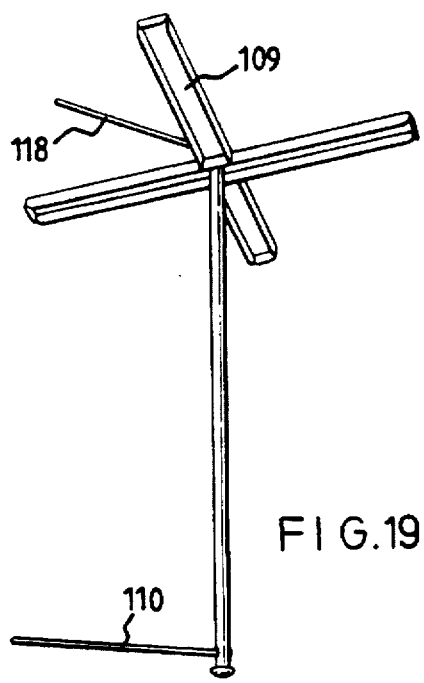
FIGS. 18 and 19 show respectively views from a top (in use) and a bottom (in use) end of a windrow, scraper or riddler of the compost bin of FIG. 9.
Figure 18:
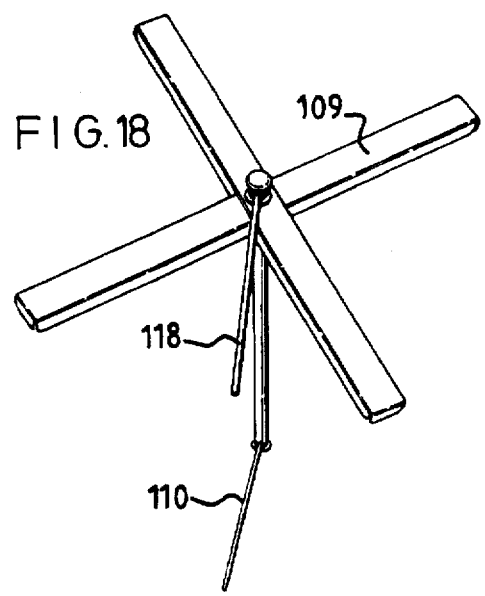
Figure 20:
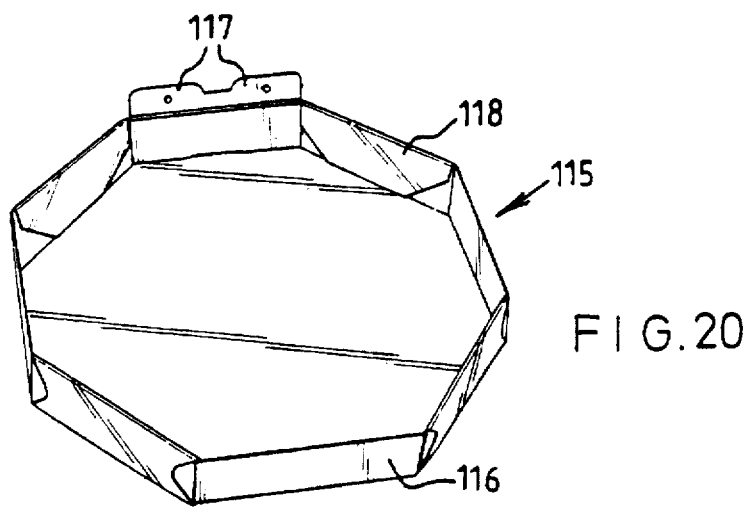
FIGS. 20–22 show respectively a bottom plan view, a top plan view, and part of a lid for the apparatus of FIGS. 9–18.
Figure 21:
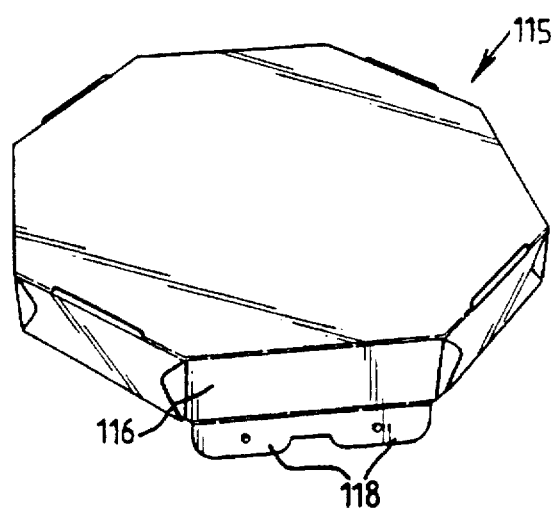
Figure 22:
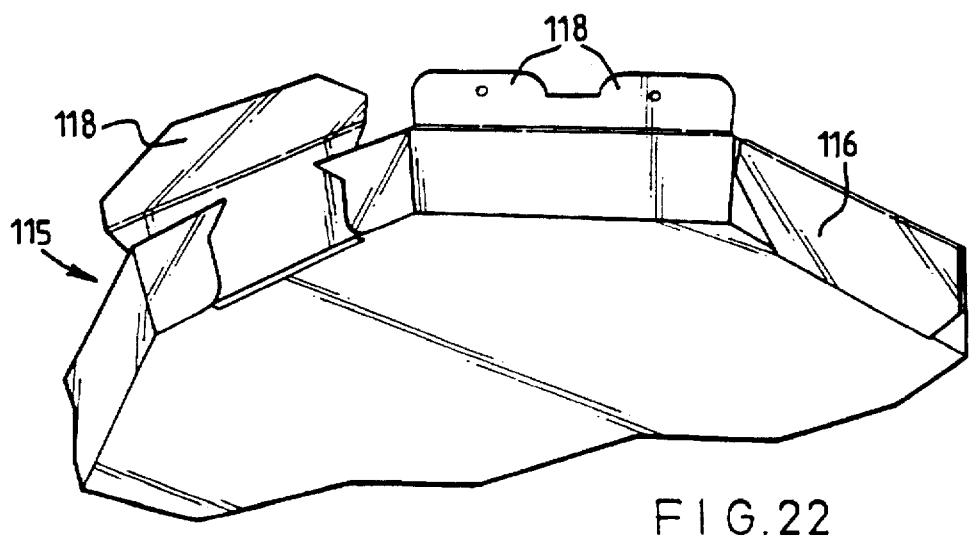
Figure 23:
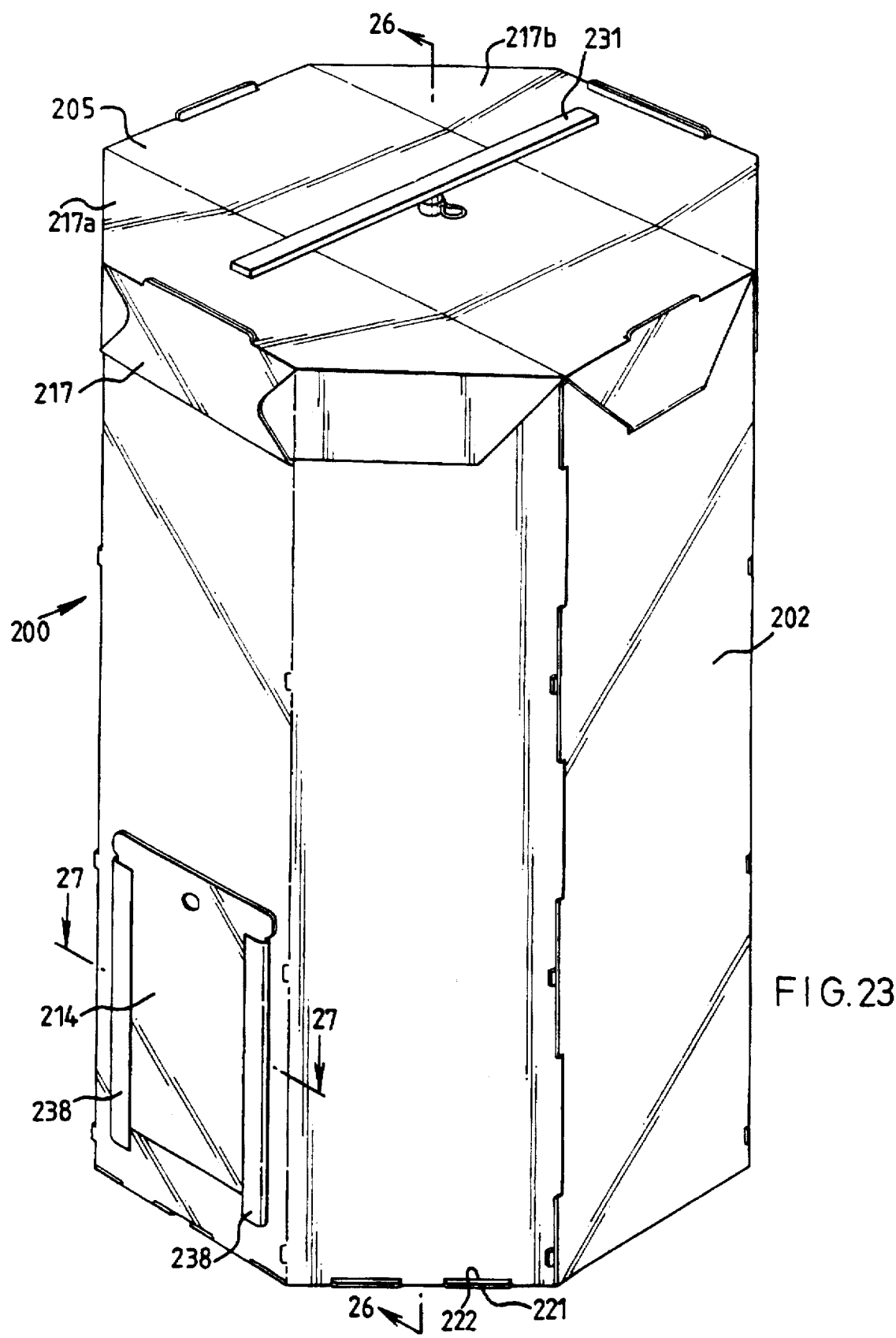
FIG. 23 shows a perspective view of a further embodiment of apparatus according to the invention for making humus, with a handle and lid thereof in one operative position.
Figure 24:
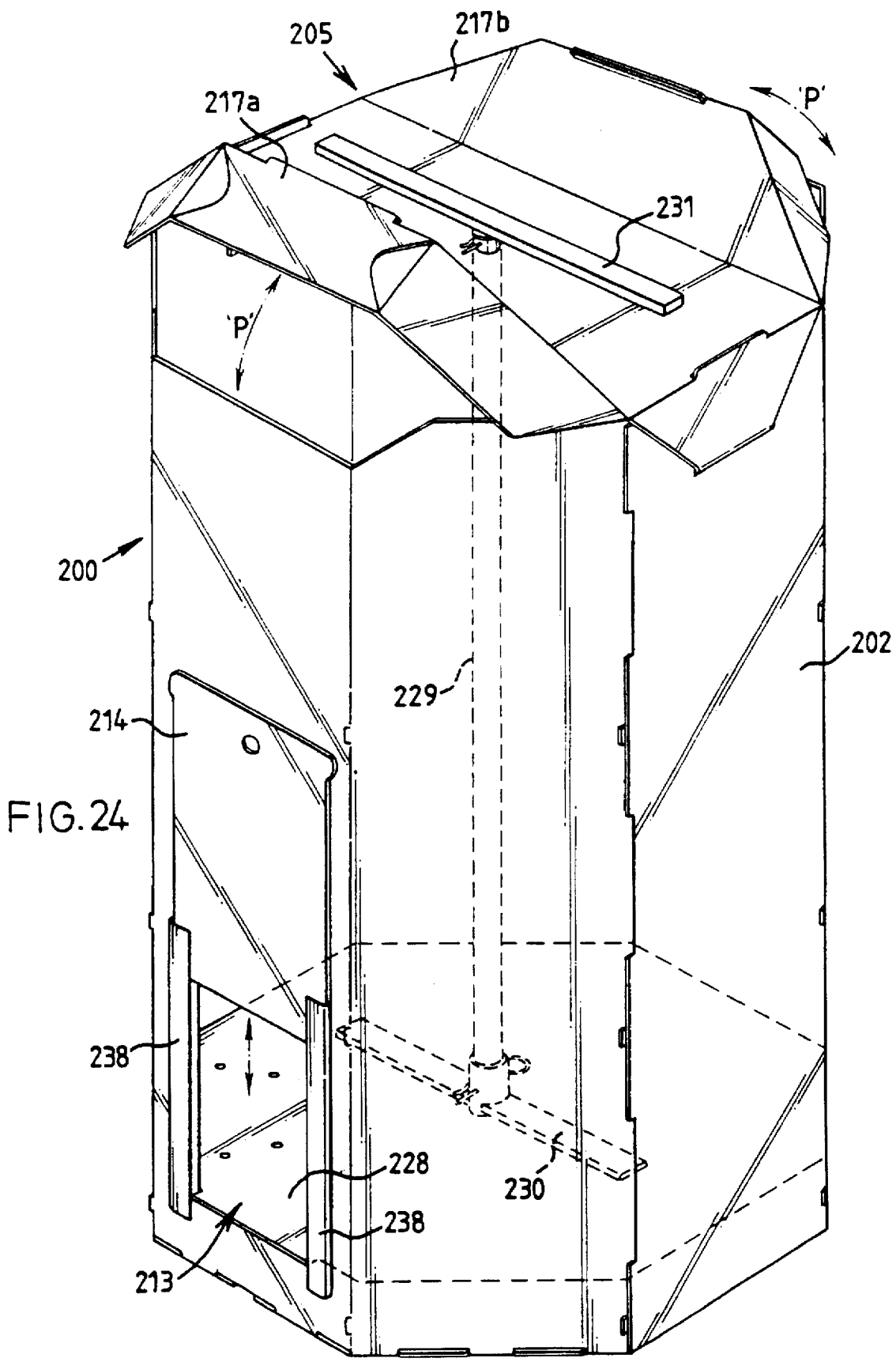
FIG. 24 shows the apparatus of FIG. 23, with the lid and handle in a second operative position.
Figure 25:
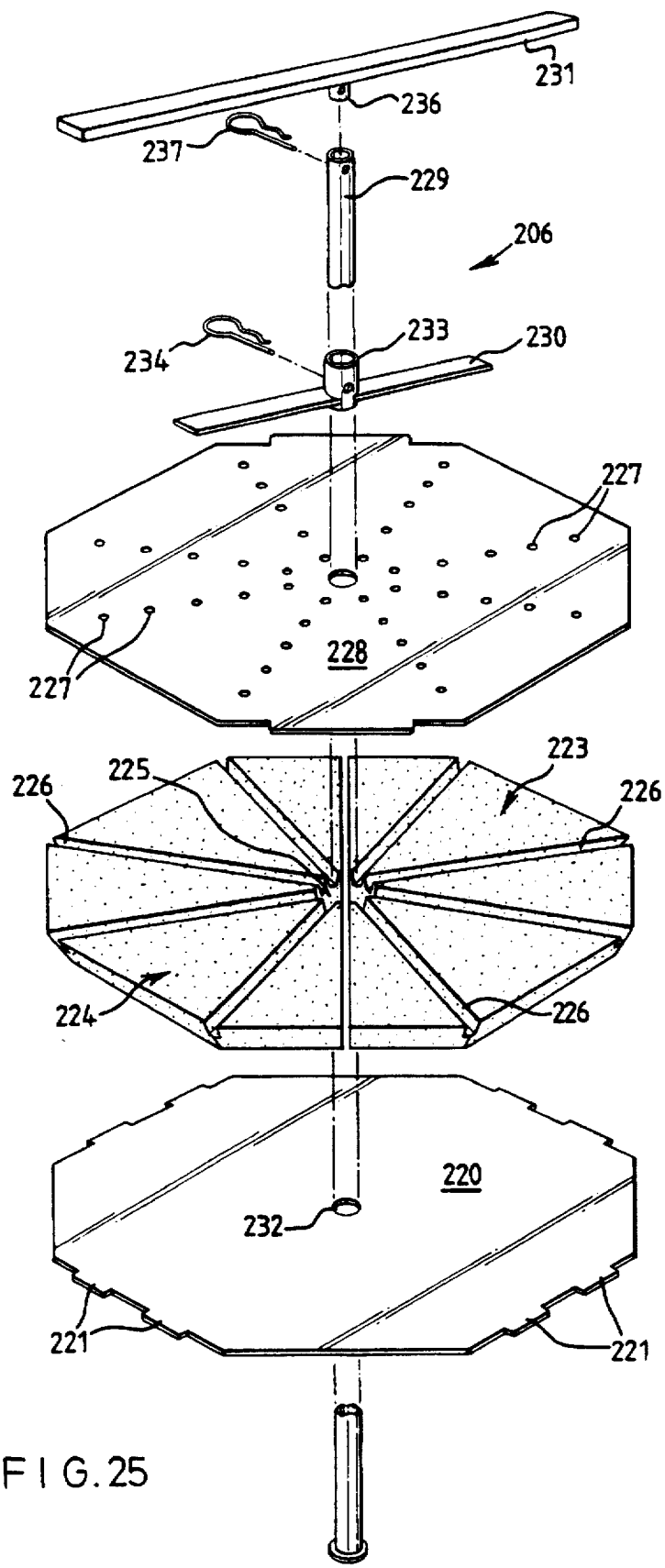
FIG. 25 shows an exploded perspective view of part of the apparatus.

In use, the body is erected by folding the flattened tube formed by secured together blanks 4 out about the hinge lines 13 to form an octagon. The base blank 9 has the flaps 14 folded to be at substantially 90° to the plane of the base and with the tube inverted, the base blank 9 is then inserted flaps 14 first so that the holes 15 through the flaps 14 are aligned with the end 6 holes 3, the spacings being virtually identical. The base blank 9 thus assists in maintaining the body in the erected condition, and the body is then inverted so that the end 6 is lowermost. The apparatus can be free standing, or inserted in a hole 17 in the ground as shown in FIGS. 5 and 6. Material such as household (kitchen) waste for composting is then placed in the body, or the base blank, and the lid is formed from the blank 10 and placed over the top 5, corners of the lid being strengthened by folding flaps 18 thereof back on themselves about double hinge lines 19 so that tongues 20 locate in notches 21. Composting then takes place aerobically by air passing through the lower holes 3 into the interior of the body, up through the body to emit from the upper holes 3. This is achieved by convection because during composting, heat is generated in the interior of the body, and as this heat rises it draws in air from the bottom 6 and causes it to flow to the top 5. As the holes 3 are spaced uniformly round the body, air is drawn in across the whole cross-sectional area of the bin, to lead to uniform composting. The holes 16 in the base blank 9 allow liquid(s) to pass out of the bin, so that owing to controlled air entry as described, a dry, sweet-smelling compost is obtained.

It will also be understood that the relatively small size of the holes 3 at the lower end 6 prevent the entry of vermin, while the holes 3 at the top end 5 provide for a relatively free flow of air which promotes the controlled aerobic composting conditions required for biological degrading of vegetable (and animal) product in the bin. In this process, $CO_2$ gas and liquid water are removed, and a sufficient temperature is produced by microbes to effect "kill" of pathogens, the resulting product being a matured humus which has no noxious gases or liquids and which can be applied to the soil in say the householder's garden.

FIGS. 4 to 8 show various other embodiments.

Figure 4:
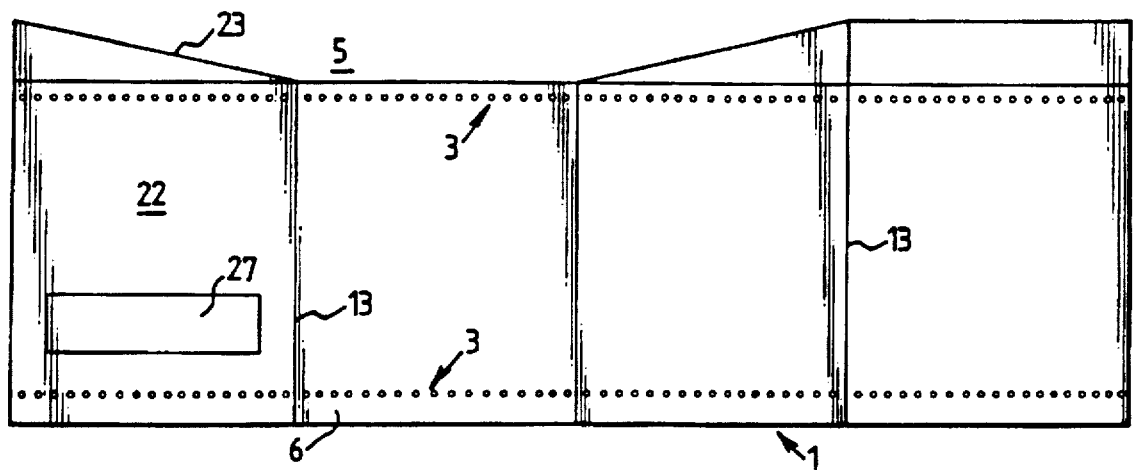
FIG. 4 shows an elevational view of a blank for a second embodiment of apparatus according to the invention for making humus.

In FIGS. 4 and 5, there is shown a blank 22 of four panels which when erected form a square apparatus or bin. The blank 22 can have a sloping upper wall 23 for a sloping lid 24 (FIG. 5) or a square top for formed lids 25, as in FIG. 6, which may also have through holes 26 to promote air flow. The bins 2 may have an integrally formed hinged door 27 to facilitate removal of humus. The hinge lines 13 may also be triple lines for ease of folding.

There may be a stake, plug, dowel or post 28 inserted at a corner to a height up to the height of the base grid 9, to assist in erection, and the inner wall may be scored so that a V-shaped fold 29 is formed on erection which with the plug forms an integral support for the base grid.

In the embodiment of FIGS. 4 to 8, the air holes 3 comprise holes through the outer wall of the fluted sheet material at the upper (as viewed) end (FIG. 8) and similar holes 31 through the inner wall at the lower (as viewed) end. The flutes then form an air passage linking the upper and lower holes, so that air flows from the outside, down through the flutes 33, into the body beneath the base or grid 9, up through the holes 16 in the grid 9, up through the material in the body 2, and out through holes at the top, say the holes 26 in the lid.

Referring now to FIGS. 9 to 22, there is shown a further embodiment of apparatus 100 for making humus, in the form of a compost bin.

The apparatus 100 shown is suitable for domestic composting, for example of kitchen waste material, and is arranged to provide aerobic decomposition throughout the whole surface area of a body 102, and not merely at the centre as is usual in standard bins. The body or bin 102 achieves this by being erectable from a set of parts comprising a blank of material such as a sheet of extruded, fluted plastic material, such as polypropylene, such as that marketed under the Registered Trade Mark "CORREX". The material may be black. The blank has fold or crease lines 104 suitable to form a plurality of panels 10 in the embodiment eight, in the erected bin 102. The opposite edges of the blank on folding about the crease lines 104 interengage by means of suitable complementary interengagement means such as tongues and slots 106. The bottom, as considered in use, of the bin, is castellated by having projecting projections, tongues or flanges 107 on alternate panels 105. The top (also considered in use) of the erected bin 102 has means such as notches 108 to mount a bracing means 109 which itself supports a windrow, rake, scraper or riddler 110.

The set of parts also includes the base 103, which in the embodiment is of metal, and is formed in one piece and defines support legs 111 and support walls 112. The legs 111 include grooves 113 formed by folding back the metal, the walls 112 being formed by folding up the metal of the base 103 at four of the eight edges. The legs 111 are at positions each intermediate two successive walls 112. The base 103 has a support platform for material to be composted, having a series of through holes 114 arranged to produce through flow of air across substantially the whole surface area of the bin 102.

There is also a lid 115, also formed from a blank of material such as "CORREX" which has a folded over boundary wall 116 for strength, and ears 117 by which the lid 118 is hingedly mounted in the bin 102.

The lid is locked in an assembled position by a folded over flap 118, the lid being formed from a suitably shaped blank with applied crease lines.

In use, the body 102 is erected into the desired octagonal shape. It is then offered up to the base 103 and lowered, as shown in the sequence of operation in FIGS. 10 to 13, so that alternate wall sections on panels 105 rest on the base interiorly of the walls 112, which support the body 102, while the alternate flanges 107 are firmly received in the grooves 113, the material of the base inboard of the body flange and the bent up metal forming the groove 113 also serving to support the body 102, which with the walls 112, mounts the body firmly in position to make a stable, erected bin 102.

The support 109, which is cruciform, is then mounted on the notches 108, so that the rake, scraper or windrow 110 is supported just above the base 103. When a handle 118 (which is within the perimeter of the body 102), is turned, the rake, scraper or windrow 110 passes over the base 103, and, in use, clears the holes 114 of material to be composted or formed compost, so that the holes 114 are kept free for air flow into the apparatus, and passage of water therefrom.

The lid 115 is mounted in place, if not already in place, and closed. It provides a neat appearance, and keeps the compostable material dry and protected from the elements.

In use, air passes between the legs 111, of the base 103 and up through the whole surface area of the composting material in the bin for composting. The composting action produces a dry humus, and carbon dioxide and water, and a rise in temperature necessary for composting, sometime in excess of 70° C. The bin provides for aerobic biological decomposition which is sufficient to kill pests, pathogenic bacteria, weed seeds and the like throughout the compost.

Because of the efficient spread of the air throughout the bin, optimum conditions for composting are provided, whereby microbial generation of heat as a metabolic by-product and the subsequent retention of that heat by the organic mass (kitchen waste) being treated is a main element of the process of composting.

There may be a means to enhance air circulation such as a bellows, or a door in the body.

Turning now to FIGS. 23 to 30, there is shown apparatus 200 which is used for making humus from household (kitchen) waste, in a similar manner to that described for previous embodiments.

The apparatus 200 is erected from a set of parts comprising two identical blanks 201, for forming the body 202, a base 203, a blank 204 for forming a lid 205 and a windrow device 206. Each blank 201 (FIG. 28) for forming the body of the apparatus 200 has hinge lines 207 defining a plurality of body panels 208 (four in the embodiment). One of the edge panels 208 has an edge flap 209 and the opposite edge panel has a plurality of projecting tongues 210, there being slots 211 of the same size and location at a hinge line 212 between the edge panel and flap 209. One of the panels has a rectangular hole 213, for forming a mounting for a door 214 so that in the erected apparatus there are two opposite doors.

The bottom (as viewed) of the blank 201 has hinged flaps 215 which fold up to form an interior ledge for the base 203. This ledge is in the erected apparatus at right angles to the length of the body 202 and rests on the ground on a kind of "foot".

The blank 204 for the lid 205 (FIG. 29) has crease lines which enable the lid 205 to be formed suitably folding thereabout, there being a wall 217 formed by flaps which are folded back on themselves so that tongues 218 enter slots 219 to hold the lid erect, and to provide strength. Also, two parallel crease lines 216 of the erected lid 217 provide raisable lid or flap parts 217a, 217b. The lid 217 is a push fit on the body 202.

The base 203 comprises a planar former or template 220 of say CORREX (Registered Trade Mark) which has tongues or nibs 221, which in use engage in slots 222 in the body, at the base, to assist in maintaining the erected body 202 in the desired shape. There is also a support in the form of two blocks of material 223, 224, suitably of polystyrene foam, which together form the whole support. There is a central hole 225 in the support, from which grooves 226 radiate in the, in use, upper surface of the support. These grooves 226 are positioned to align vertically with radial rows of perforations 227 in a sheet 228 of material such as CORREX which sits down on top of the supports 223, 224 so that the grooves 226 are aligned with the holes 227. This enables air to pass up through the material to be composted in use, and enables liquid water formed during the composting process to run away from the material.

The windrow device 206 comprises a central shaft 229 a blade 230 mounted in use at the base thereof to engage the top surface of the perforated base lightly, and a handle device 231 mounted on the upper end of the shaft 229 exteriorly of the lid 205.

In use, the body 202 of the apparatus 200 is erected by folding and connection of the two blanks 201 (only one has been shown in FIG. 28), to form an upright tube. The shaft 229 is then passed up through a central hole 232 in the sheet 220, which is then pushed down through the interior of the body 202 to the ledge or foot until its tongues 221 snap into and project through the slots 222. The body 202 is then maintained in its octagonal shape. The support parts 223, 224 which together form an octagon too, are inserted, to rest on the sheet 220, surrounding the shaft 229. The perforated sheet 228 is then offered up to the free (upper) end of the shaft 229 and slid down to sit on the supports 223, 224, a line of perforations 227 being aligned vertically with a respective groove 226 in the support 223, 224. The windrow blade 230 is then slid down the shaft via a boss 233, and a spring locking pin 234 is pushed through (aligned) holes in the boss 233 and shaft 229, to clip round the shaft and hold the blade 230 in place.

Figure 26:
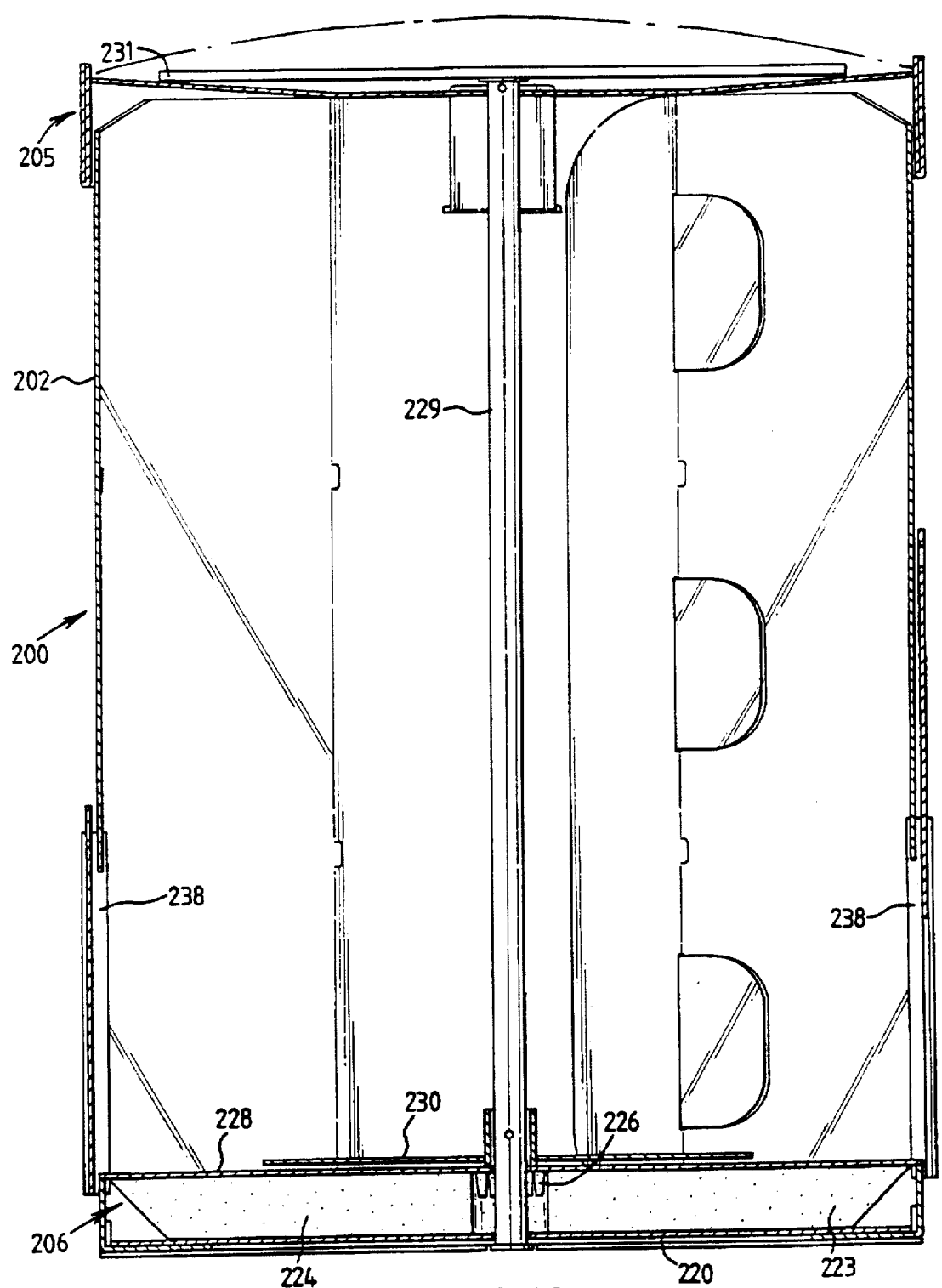
FIG. 26 shows a longitudinal sectional view of the apparatus of FIGS. 23 to 25, taken on the line '26'—'26' of FIG. 23.
Figure 27:
FIG. 27 shows a sectional view of part of the apparatus of FIGS. 23 to 26, taken on the line '27'—'27—of FIG. 23.
Figure 28:
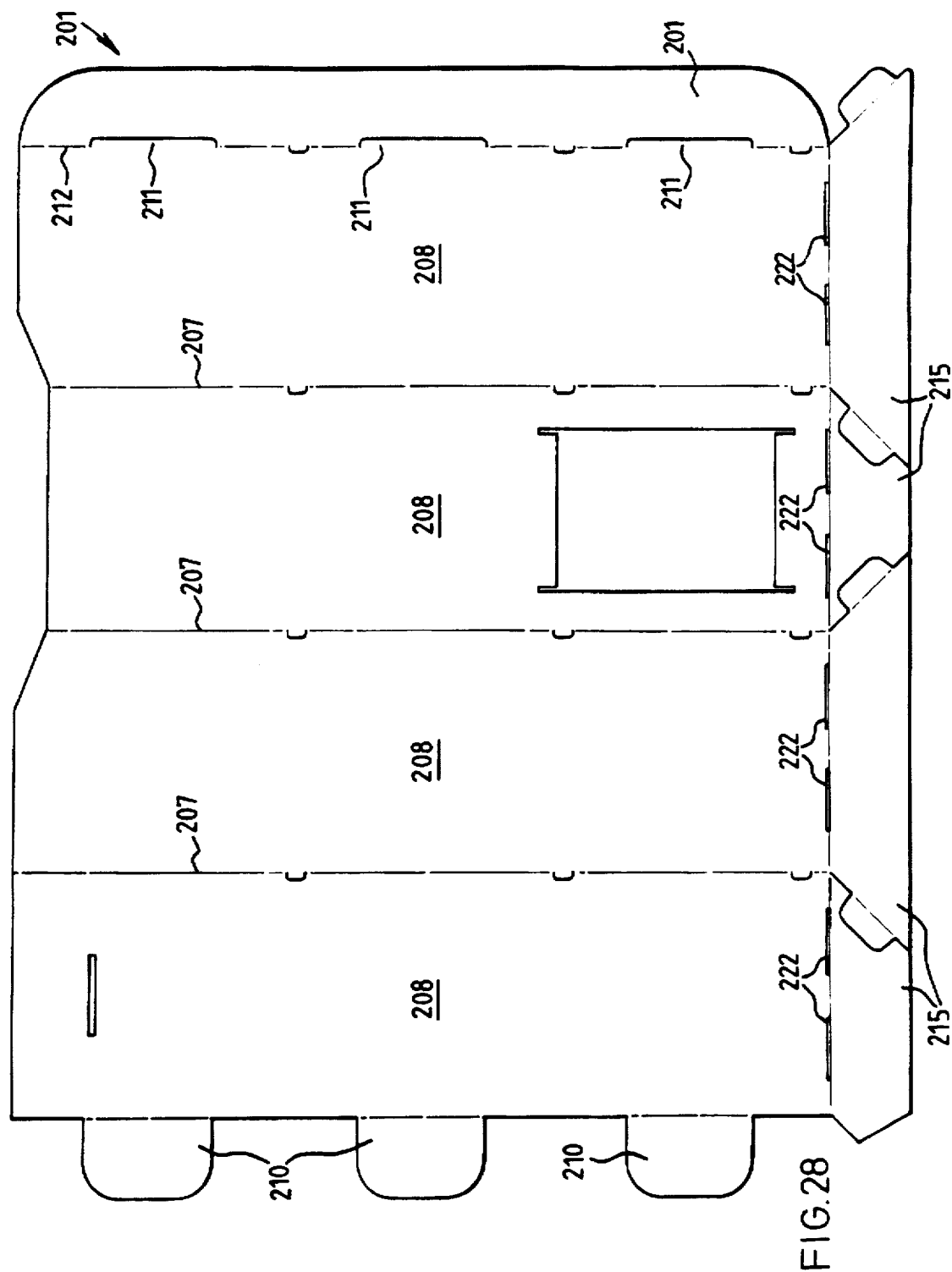
FIG. 28 shows a plan view of a blank from a pair of which the apparatus of FIGS. 23 to 27 is erected.
Figure 29:
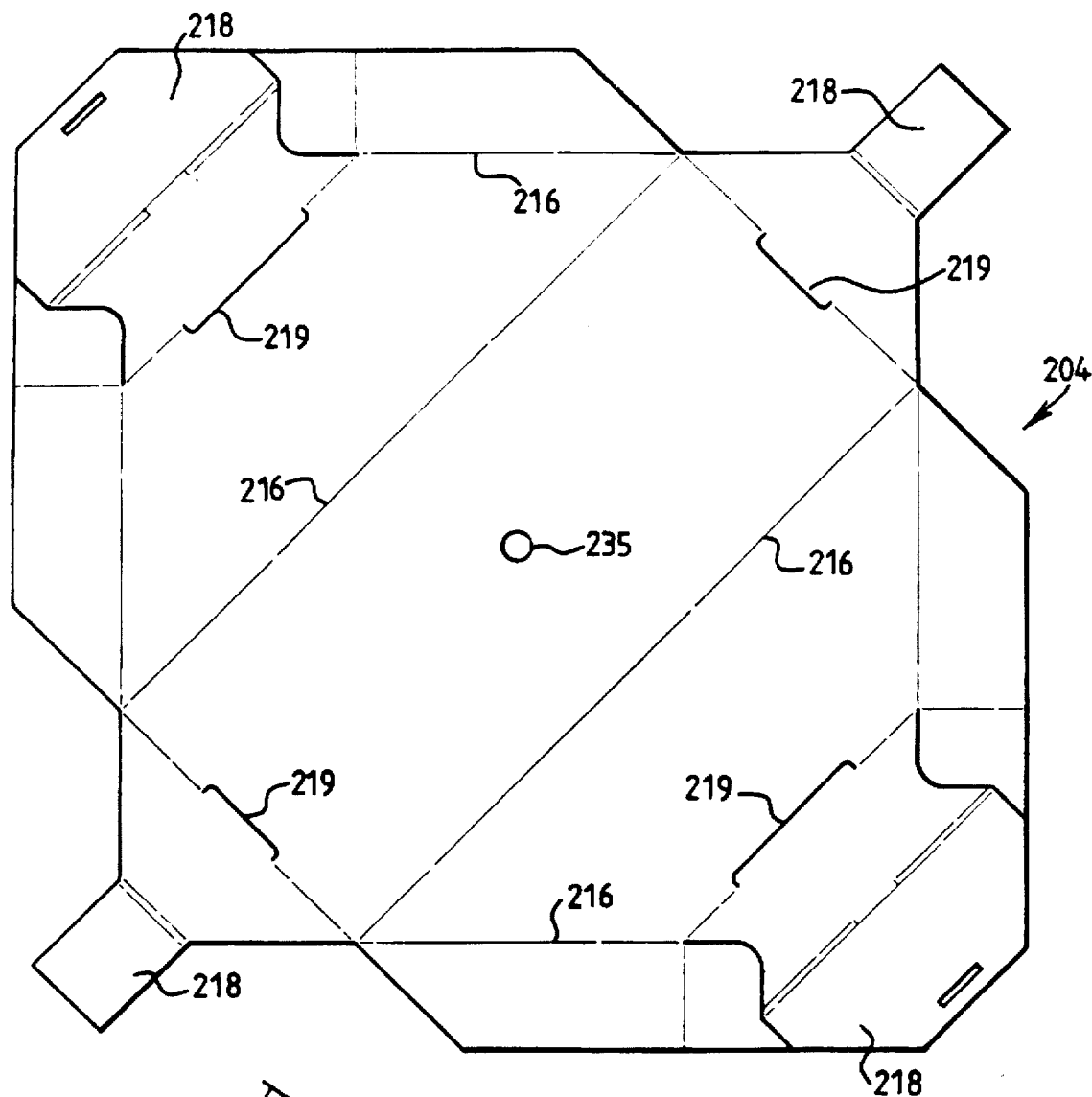
FIG. 29 is a plan view of a blank from which the lid of the apparatus of FIGS. 23 to 28 is erected.

The lid 205 is erected from the blank 204 to provide a rigid structure having a domed roof configuration as shown in FIG. 26 in dashed lines, or planar, as shown in solid lines, and the double skin downwardly depending wall 217 which is formed by folding up the flaps through 180° so that the tongues 218 are locked in slots 219.

There is a central hole 235 through the lid 205, which is offered up to the shaft 229, and slid thereover. The handle 231 is then mounted via a boss 236 on the shaft, and fixed in position by a spring clip 237 which is passed through aligned holes in the boss 230 of the handle and in the upper pan of the shaft 229. The spring clip 237 grips the shaft 229 to secure the handle 231 and shaft 229 together.

S-shape or double channel profiles 238 are then mounted on the flanking edges of the hole 213 (FIG. 27), and the door 214 is slid into place to provide a vertically slidable door.

In use, kitchen waste is placed in the apparatus 200 and over a period of time, aerobic composting takes place by air passing through the grooves 226, up through the holes 227 through the material, to increase the temperature and produce gaseous carbon dioxide which passes out through the top of the apparatus, and liquid water which passes out through the perforations 227 and grooves 226. The perforations 227 and grooves 226 thus are aligned, for passage of air into the apparatus, and water out of the apparatus.

The perforations 227 are kept unplugged by turning the windrow device 203 via the handle 231 so that the blade 230 is turned, to remove material from the holes 227, and to "turn" the material which is being composted.

The handle 231 has two functions. In the operative position shown in FIG. 23, it extends transversely to the fold lines of the flap parts 217a, 217b of the lid 205, and holds them down, so maintaining the lid in place, and preventing the flap part from being raised as for example by wind. When the handle 231 is turned through 90° to the FIG. 24 position, the handle is substantially parallel to the hinge lines of the flap parts 217a and 217b which can be raised, and lowered, as shown by the double headed arrow 'P' in FIG. 24 to allow access to the interior for the addition of new material. Turning to open the lid also automatically turns the blade 230, so the holes are always kept clear and the material is always turned, every time a user uses the apparatus.

A door 214 is slid up to remove mature compost. Normally, the door is closed, and the lid 205 is in place with the flap parts 217a, 217b down, so as to provide for an enclosed body os that a desired temperature rise is achieved during composting.

Figure 30:
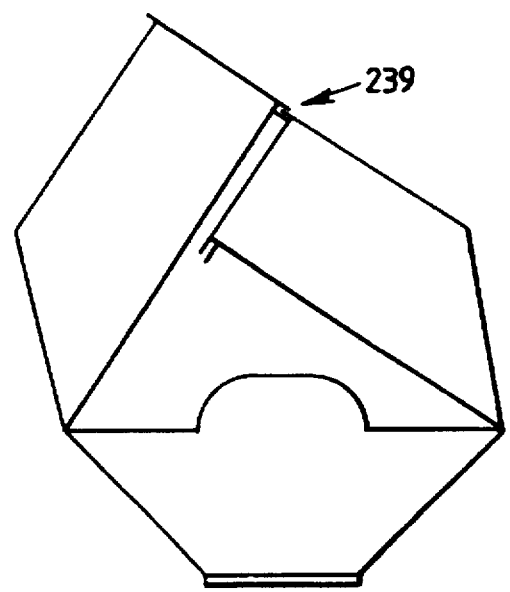
FIG. 30 is a schematic view of a strut member of the lid.

In order to keep the flap parts 217a, 217b raised so that a user has unobstructed access to the interior of the apparatus 200 the flap parts have locking tabs 239 which interengage when the opposite lid parts 217a, 217b are opened and raised towards each other, in order to prop the flap parts open. The flaps and tabs keep the flap parts open as shown in FIG. 30, which is a view in direction 'T' in FIG. 29.

Figure 31:
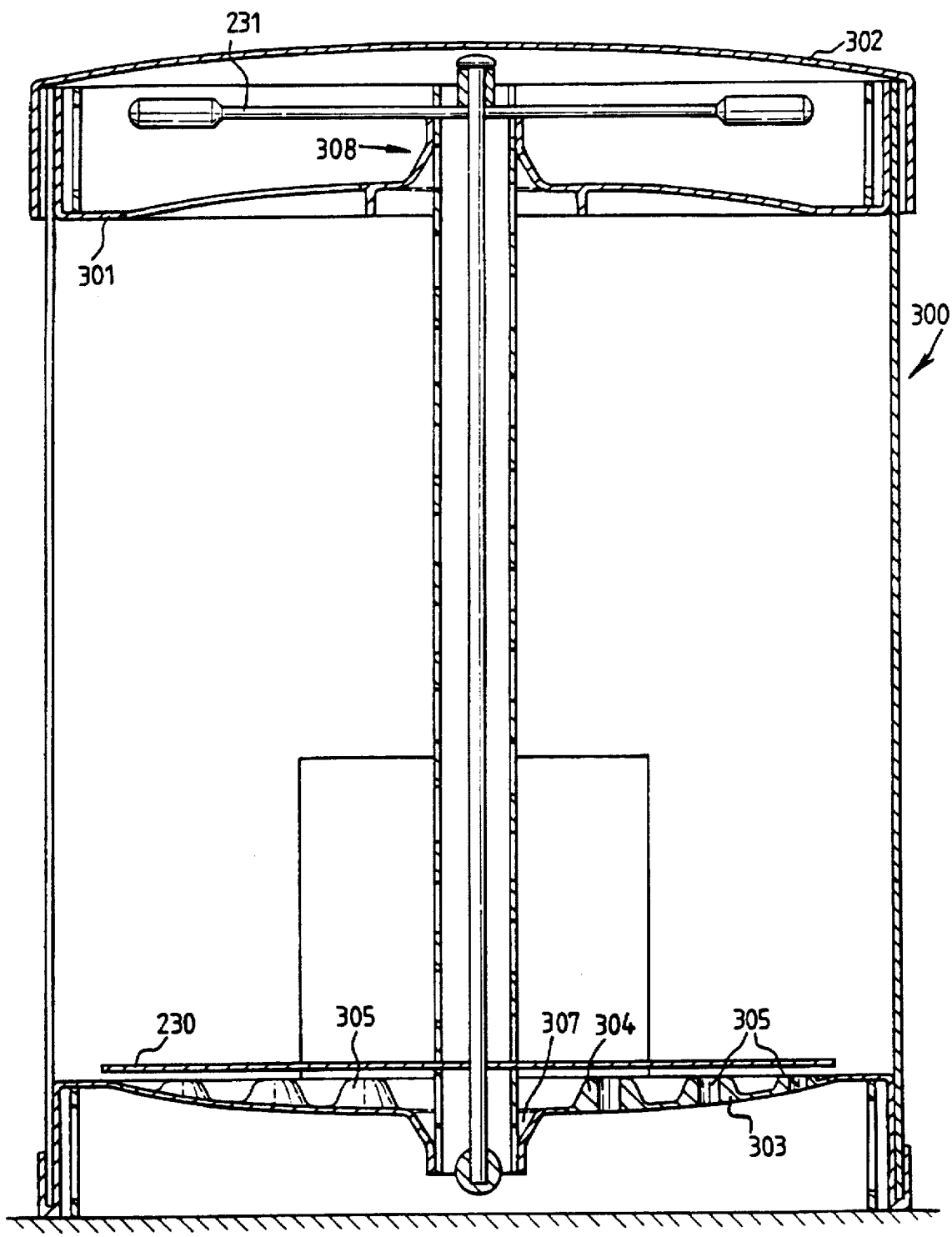
FIG. 31 is a sectional view of another embodiment of apparatus according to the invention for making humus.
Figure 32:
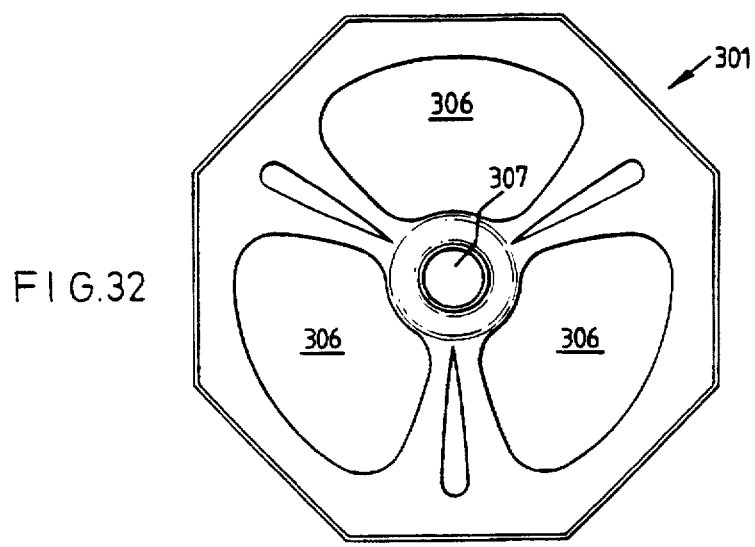
FIG. 32 is a plan view of a member which can function as a lid and as a base for the apparatus of FIG. 31.

Turning now to FIG. 31, there is shown a further embodiment of apparatus 300 for making humus, which is similar to the previous embodiments, (like parts being identified by like numbers) there being a top or dished or external top supporting frame 301 which is covered by a domed lid 302, the handle 231 being under (in use) the lid 302. The dished support 301 can be inverted through 180° to form the base 303 on which is placed a grid 304 to provide air holes 305 through which air can pass from three (in the embodiment) apertures 306 in the support member. The dished part has a central hole 307 through which water formed during composting can escape. The blade 230 runs around the top of the grid 305 to keep the air holes 305 free for passage of air. A dished part 308 of the support part 301 forms a recess in which a user's hand can be received for turning the handle 231.

The support part 301 can be an integral moulded piece made for example from injection moulded plastics material.

The lid has hinged parts as in the previously described embodiment.

Figure 33:
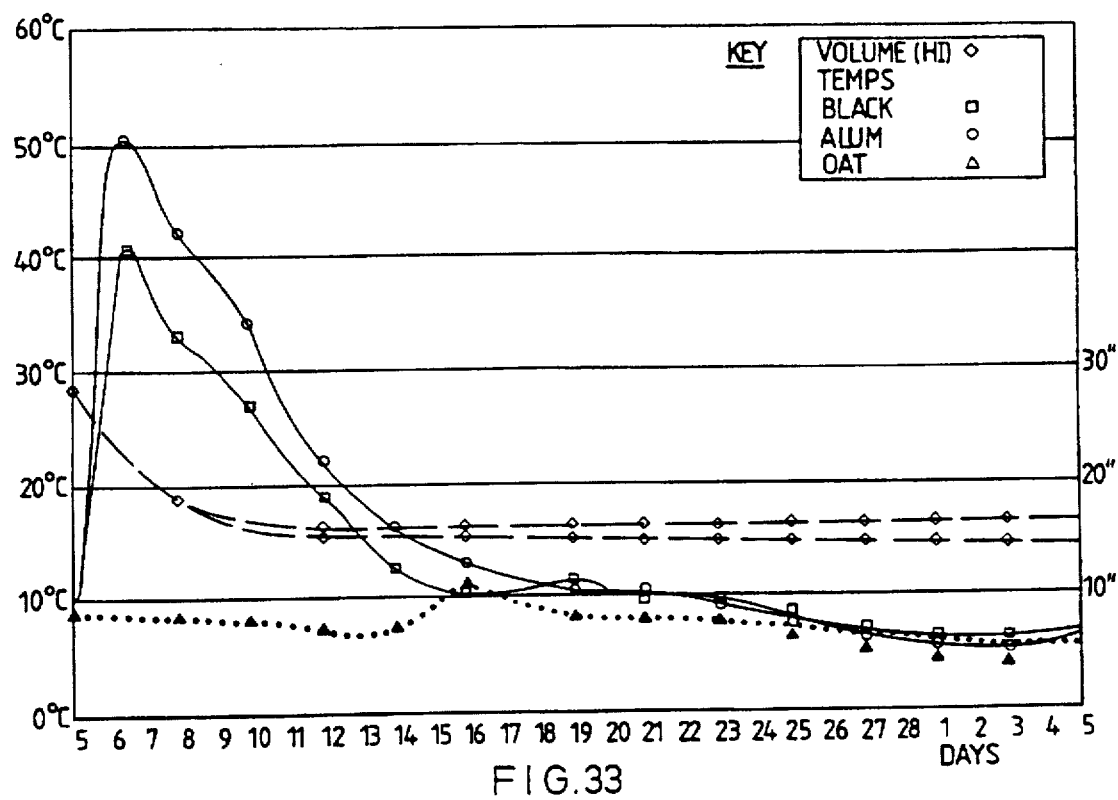
FIG. 33 shows graphically results of use of apparatus according to FIGS. 23 to 30.

FIG. 33 shows graphically use of an apparatus according to FIGS. 23 to 30. The ambient temperature was low (10° C.), and there was no solar gain (no sunshine) yet the temperature rose to 50° C. within a day or so, so providing conditions for pathogen "kill".

The blade may be sharpened on both edges so that whichever way it is rotated, it has a sharpened "leading" edge for "cutting" through the material to be composted, and for turning same. Also, alternatively or in addition, the free ends of the blade may be scalloped for efficient "cutting" and "turning" and stirring up of the material. The blades could also be of propeller shape.

It will be understood that apparatus as hereinbefore described can be of any desired shape, such as round or oval other than the shape described, and that all are packed flat, relatively readily assembled, rain-proof, vermin proof, odour free, insulated and aerobic in action.

Also, in every embodiment, the apparatus is readily assemblable without the aid of tools. The apparatus in the form of a kit or set of parts can thus be delivered in a "knock-down" pack for assembly on site. The apparatus can be supplied by local Authorities to householders in their region, so enabling and encouraging householders to create their own humus, which when used on the land produces a soil-enhancing product which also has the advantage that the local Authority does not have to provide for waste disposal and landfill.

The air supply in all embodiments is vermin-safe, and is assisted in any direction by the incident wind and as stated previously enters at the perimeter of the bin for aerobic conditions throughout the contents. The air flow may be reversed in exceptionally hot conditions which can speed up the aerobic process in newly added material for example in mid-summer when garden waste is most plentiful and is added to the kitchen waste.

I claim:

1. Apparatus for making humus, comprising a body for containing material to be composted to humus, a base having means for promoting air flow therethrough and through the body, and a lid, whereby the base and lid promote aerobic decomposition of material to be composted, the base comprising a planar member including a plurality of radially arranged rows of perforations on which the material to be composted is received and support means for receiving the perforated planar member, the support means having a configuration substantially complementary to the planar member, and a surface of the support means having radially arranged grooves alignable with said radially arranged rows of perforations through the planar member for fluid communication therebetween.

2. Apparatus as defined in claim 1, further including a mixer for mixing material to be composted mounted within said body and manually turnable to keep said plurality of perforations free for entry of air.

3. Apparatus as defined in claim 2, wherein the mixer device comprises a blade mounted on a rotatable shaft and a handle of the rotatable shaft mounted exteriorly of the body.

4. Apparatus as defined in claim 3, wherein the handle is mounted exteriorly of the lid and adapted to be turned in a plane substantially parallel to the plane of the lid.

5. Apparatus as defined in claim 3, wherein the lid has two raisable flap parts and the handle is adapted in one operative position to maintain at least one flap part closed and in another operative position permitting at least one flap part to be raised.

6. Apparatus as defined in claim 3, wherein the blade has sharpened edges.

7. Apparatus as defined in claim 3, wherein the blade is substantially centrally mounted on a shaft and wherein the ends of the blade are profiled to provide a surface adapted for turning the material to be composted.

8. Apparatus as defined in claim 1, wherein the lid has at least one flap part which is raisable whereby to provide access to the interior of the body.

9. Apparatus as defined in claim 8, wherein there is a strut of the lid adapted to maintain a flap in the open position.

10. Apparatus as defined in claim 1, wherein there is a door in the body to permit removal of humus material.

11. Apparatus as defined in claim 1, wherein said apparatus is erectable from a set of parts comprising a collapsible tube for forming the body and a base insertable in the tube for maintaining same in the erected condition.

12. Apparatus as defined in claim 11, wherein the collapsible tube comprises a plurality of blanks secured edge-to-edge.

13. Apparatus as defined in claim 12, wherein there are two blanks.

14. Apparatus as defined in claim 1, wherein the body comprises a double walled sheet material.

* * * * *